US008540188B2

(12) United States Patent
Nakagawa et al.

(10) Patent No.: US 8,540,188 B2
(45) Date of Patent: Sep. 24, 2013

(54) AIRCRAFT ACTUATOR HYDRAULIC APPARATUS

(75) Inventors: Shingo Nakagawa, Gifu (JP); Atsushi Fukui, Gifu (JP)

(73) Assignee: Nabtesco Corporation (JP)

( * ) Notice: Subject to any disclaimer, the term of this patent is extended or adjusted under 35 U.S.C. 154(b) by 20 days.

(21) Appl. No.: 13/250,540

(22) Filed: Sep. 30, 2011

(65) Prior Publication Data
US 2012/0085860 A1   Apr. 12, 2012

(30) Foreign Application Priority Data

Oct. 8, 2010   (JP) .................................. 2010-228357

(51) Int. Cl.
*B64C 5/10* (2006.01)
(52) U.S. Cl.
USPC .......................... 244/99.4; 244/99.6; 244/99.5
(58) Field of Classification Search
USPC ................ 244/99.6, 99.5, 99.2, 213; 60/405, 60/592; 138/30
See application file for complete search history.

(56) References Cited

U.S. PATENT DOCUMENTS

| | | | | |
|---|---|---|---|---|
| 2,557,298 A | * | 6/1951 | Leece et al. ..................... | 290/50 |
| 3,347,495 A | * | 10/1967 | Eberhardt et al. ............. | 244/207 |
| 5,109,672 A | * | 5/1992 | Chenoweth et al. ............ | 60/456 |
| 5,705,865 A | * | 1/1998 | Ishida et al. ..................... | 310/62 |
| 5,903,073 A | * | 5/1999 | Mukai ............................. | 310/64 |
| 7,600,715 B2 | * | 10/2009 | Matsui .......................... | 244/99.6 |
| 7,870,726 B2 | * | 1/2011 | Matsui ............................. | 60/405 |
| 8,191,824 B2 | * | 6/2012 | Shaheen et al. ............. | 244/76 A |
| 2003/0226467 A1 | * | 12/2003 | Nardone et al. .............. | 102/489 |
| 2006/0196633 A1 | * | 9/2006 | Mahjoub .......................... | 165/41 |
| 2006/0226285 A1 | * | 10/2006 | Matsui ......................... | 244/99.6 |
| 2009/0084890 A1 | * | 4/2009 | Reinhardt .................... | 244/12.4 |
| 2009/0266934 A1 | * | 10/2009 | Makino ........................ | 244/99.5 |
| 2011/0051127 A1 | * | 3/2011 | Kusaka et al. ................ | 356/128 |
| 2011/0068221 A1 | * | 3/2011 | Recksiek et al. ............. | 244/99.5 |
| 2011/0256000 A1 | * | 10/2011 | Fukui ............................. | 417/213 |
| 2011/0264242 A1 | * | 10/2011 | Nakagawa et al. ............. | 700/21 |
| 2011/0266390 A1 | * | 11/2011 | Nakagawa et al. .......... | 244/99.5 |
| 2011/0278392 A1 | * | 11/2011 | Fukui ............................. | 244/99.6 |
| 2011/0290353 A1 | * | 12/2011 | Fukui et al. .............. | 137/565.11 |
| 2012/0001021 A1 | * | 1/2012 | Fukui ............................. | 244/99.6 |
| 2012/0029859 A1 | * | 2/2012 | Fukui et al. .................. | 702/114 |
| 2012/0032026 A1 | * | 2/2012 | Becker et al. ............... | 244/118.5 |
| 2012/0045613 A1 | * | 2/2012 | Sanderson .................... | 428/137 |
| 2012/0131912 A1 | * | 5/2012 | Fukui et al. ..................... | 60/405 |
| 2012/0273613 A1 | * | 11/2012 | Ulbrich-Gasparevic et al. ......................... | 244/118.1 |

FOREIGN PATENT DOCUMENTS

JP   10-030857   2/1998
JP   2007-046790 A   2/2007

* cited by examiner

*Primary Examiner* — Christopher P Ellis
*Assistant Examiner* — Medhat Badawi
(74) *Attorney, Agent, or Firm* — Studebaker & Brackett PC

(57) ABSTRACT

A hydraulic pump is installed inside a wing at which a control surface is provided, and supplies pressure oil to an actuator when a loss or degradation occurs in the function of aircraft central hydraulic power sources. An electric motor is installed inside the wing and drives the backup hydraulic pump. A driver is installed inside the wing and drives the electric motor. A cooling device is installed inside the wing and simultaneously cools the backup hydraulic pump, the electric motor, and the driver.

7 Claims, 5 Drawing Sheets

AIRCRAFT ACTUATOR HYDRAULIC APPARATUS

CROSS-REFERENCE TO RELATED APPLICATIONS

This application claims priority to Japanese Patent Application No. 2010-228357. The entire disclosure of Japanese Patent Application No. 2010-228357 is hereby incorporated herein by reference.

BACKGROUND OF THE INVENTION

1. Field of the Invention

The present invention relates to an aircraft actuator hydraulic apparatus that supplies pressure oil to a hydraulically operated actuator for driving a control surface of an aircraft.

2. Description of Related Art

An aircraft is provided with control surfaces that are formed as moving surfaces (flight control surfaces) and are configured as an aileron, an elevator, and the like. Hydraulically operated actuators are often used as actuators for driving such control surfaces. Further, pressure oil is supplied to such an actuator from an aircraft central hydraulic power source. However, a loss or degradation of the function (pressure oil supply function) of the aircraft central hydraulic power source may occur. To address this problem, JP 2007-46790A discloses a hydraulic apparatus (aircraft actuator hydraulic apparatus) that can supply pressure oil to an actuator even if a loss or degradation of the function of the aircraft central hydraulic power source occurs.

The aircraft actuator hydraulic apparatus disclosed in JP 2007-46790A includes a pump that is provided independently of the aircraft central hydraulic power source. The hydraulic apparatus also includes an electric motor for driving the pump and a driver for driving the electric motor. The pump is provided so as to raise the pressure of pressure oil that is discharged from the actuator and to supply the pressure oil to the actuator. The electric motor is configured to drive the pump when the aircraft central hydraulic power source undergoes a loss or degradation in its function due to a pressure decrease. Additionally, JP 10-30857A discloses a cooling device for cooling an electronic device mounted to an aircraft.

SUMMARY OF THE INVENTION

Even if a loss or degradation of the function of the aircraft central hydraulic power source occurs in an aircraft, the actuator can be driven by operating an aircraft actuator hydraulic apparatus as disclosed in JP 2007-46790A. However, in the case of a loss or degradation of the function of the aircraft central hydraulic power source, the above-described hydraulic apparatus is continuously running, and therefore the temperature of the pump, the electric motor, and the driver of the hydraulic apparatus will increase. For this reason, in order to suppress the increase in temperature of the hydraulic apparatus, a cooling device for cooling each of the pump, the electric motor, and the driver is needed.

On the other hand, JP 10-30857A discloses a cooling device for cooling the electronic device mounted to the aircraft as described above. However, this cooling device is configured as a mechanism that cools the electronic device by guiding the air outside the aircraft body to the electronic device and thereafter discharging the air to the outside, and therefore drag will increase during a flight, leading to a decrease in efficiency of the body of the aircraft. Thus, a cooling device capable of preventing a decrease in efficiency of the body of an aircraft is desired.

In recent years, a further reduction in weight of aircrafts is required, and therefore the size reduction and the weight reduction also need to be realized for the above-described hydraulic apparatus as a hydraulic apparatus also including a cooling device.

In view of the foregoing circumstances, it is an object of the present invention to provide an aircraft actuator hydraulic apparatus that can drive an actuator even in the case of a loss or degradation of the function of the aircraft central hydraulic power source, that can prevent a decrease in efficiency of the body of an aircraft, that can suppress an increase in temperature of the apparatus, and that can realize a reduction in size and weight of the configuration of the apparatus.

According to a first aspect of an aircraft actuator hydraulic apparatus according to the present invention for achieving the above-described object, there is provided an aircraft actuator hydraulic apparatus that supplies pressure oil to a hydraulically operated actuator for driving a control surface of an aircraft, the apparatus including: a backup hydraulic pump that is installed inside a wing at which the control surface of the aircraft is provided and that can supply pressure oil to the actuator when a loss or degradation occurs in a function of an aircraft central hydraulic power source that supplies pressure oil to the actuator; an electric motor that is installed inside the wing and that drives the backup hydraulic pump; a driver that is installed inside the wing and that drives the electric motor; and a cooling device that is installed inside at least one of the wing and a body of the aircraft and that simultaneously cools the backup hydraulic pump, the electric motor, and the driver.

With this configuration, even if a loss or degradation of the function of the aircraft central hydraulic power sources occurs, the actuator can be driven by the pressure oil supplied from the backup hydraulic pump installed inside the wing. Also, the backup hydraulic pump, the electric motor, and the driver are installed inside the wing at which the elevator is installed, and are thus installed in a region closer to the actuator. Accordingly, there is no need for a long, large piping system or the like that is required when they are installed on the body side of the aircraft. This makes it possible to realize a reduction in size and weight of an aircraft actuator hydraulic apparatus (hereinafter, also referred to as a "hydraulic apparatus"). Further, in the hydraulic apparatus having this configuration, the cooling device for suppressing an increase in temperature of the apparatus is configured to simultaneously cool the backup hydraulic pump, the electric motor, and the driver. Accordingly, the backup hydraulic pump, the electric motor, and the driver can be efficiently cooled by the same cooling device. This makes it possible to suppress an increase in temperature of the apparatus, while realizing a reduction in size and weight of the apparatus by efficiently sharing the cooling device. Accordingly, it is possible to realize a reduction in size and weight of the hydraulic apparatus also including the cooling device. Further, the cooling device is installed inside the body of the aircraft or inside the wing, and it is therefore possible to prevent a reduction in the efficiency of the aircraft body.

Therefore, with this configuration, it is possible to provide an aircraft actuator hydraulic apparatus that can drive the actuator even in the case of a loss or degradation of the function of the aircraft central hydraulic power source, that can prevent a decrease in efficiency of the body of the aircraft, that can suppress an increase in temperature of the apparatus, and that can realize a reduction in size and weight of the configuration of the apparatus.

According to a second aspect of an aircraft actuator hydraulic apparatus of the present invention, in the aircraft actuator hydraulic apparatus of the first aspect, the cooling device is a fan that rotates together with a rotating shaft of the electric motor.

Furthermore, with this configuration, the cooling fan that is installed in the electric motor and rotates together with the rotating shaft can be utilized efficiently to cool the backup hydraulic pump and the driver as well. Accordingly, it is possible to further increase the efficiency of the cooling device, thus realizing a further reduction in size and weight of the hydraulic apparatus.

According to a third aspect of an aircraft actuator hydraulic apparatus of the present invention, in the aircraft actuator hydraulic apparatus of the second aspect, the electric motor, the backup hydraulic pump, and the driver are installed on a downstream side of cooling air generated by the fan, and the driver is installed further downstream with respect to the electric motor and the backup hydraulic pump.

With this configuration, the electric motor, the backup hydraulic pump, and the driver are installed on the downstream side of the cooling air generated by the fan for cooling the electric motor that rotates together with the rotating shaft of the motor. Accordingly, the cooling air generated by the fan for cooling the electric motor can be efficiently flown to the driver, in addition to the backup hydraulic pump coupled to the electric motor, thus realizing further efficient cooling. This makes it possible to improve the efficiently of the cooling device even further, thus achieving a further reduction in size and weight of the hydraulic apparatus.

According to a fourth aspect of an aircraft actuator hydraulic apparatus of the present invention, in the aircraft actuator hydraulic apparatus of the second aspect, the electric motor, the backup hydraulic pump, and the fan are installed in a unitary casing.

With this configuration, the electric motor, the backup hydraulic pump, and the fan are installed in a unitary casing. This results in a state in which an uneven temperature distribution does not easily occur because the equalization of temperature is promoted by the heat conduction among the electric motor and the backup hydraulic pump. Accordingly, it is possible to provide even more efficient cooling by the fan. Thus, it is possible to further increase the efficiency of the cooling device, thus realizing a further reduction in size and weight of the hydraulic apparatus.

According to a fifth aspect of an aircraft actuator hydraulic apparatus of the present invention, in the aircraft actuator hydraulic apparatus of the first aspect, the cooling device is an oil pipe that is installed so as to allow heat exchange with the backup hydraulic pump and the electric motor and that is installed so as to allow heat exchange also with the driver.

With this configuration, the cooling device configured as the oil pipe is installed so as to allow heat exchange with all of the backup hydraulic pump, the electric motor, and the driver. Accordingly, the heat generated in the electric motor, the backup hydraulic pump, and the driver can be removed via the oil pipe, thus efficiently cooling the electric motor, the backup hydraulic pump, and the driver. Furthermore, the cooling device can be configured using any of various oil pipes, and it is therefore possible to further increase the efficiency of the equipment. Accordingly, it is possible to realize a further reduction in size and weight of the hydraulic apparatus.

According to a sixth aspect of an aircraft actuator hydraulic apparatus of the present invention, in the aircraft actuator hydraulic apparatus of the fifth aspect, the oil pipe is a pipe through which flows pressure oil that is supplied from the backup hydraulic pump and is circulated between the backup hydraulic pump and the actuator.

With this configuration, the pipe for the pressure oil that is supplied from the backup hydraulic pump and is circulated can also be used as the cooling device. Accordingly, it is possible to further increase the efficiency of the equipment, thus achieving a further reduction in size and weight of the hydraulic apparatus.

According to a seventh aspect of an aircraft actuator hydraulic apparatus of the present invention, in the aircraft actuator hydraulic apparatus of the sixth aspect, the oil pipe is installed so as to pass through the inside of a fuel tank in which fuel for the aircraft can be stored.

With this configuration, the pressure oil pipe also used as the cooling device passes through the inside of the fuel tank of the aircraft. Accordingly, heat is exchanged between the pressure oil and the fuel in the fuel tank, and the heat generated in the backup hydraulic pump and the like is removed, thus releasing heat from the pressure flowing through the pipe to the fuel in the fuel tank. This makes it possible to efficiently cool the fuel in the fuel tank by using the pressure oil flowing through the pressure oil pipe as the cooling device.

According to an eighth aspect of an aircraft actuator hydraulic apparatus of the present invention, in the aircraft actuator hydraulic apparatus of the first aspect, the electric motor, the backup hydraulic pump, and the driver are provided integrally so as to allow heat conduction among each other.

With this configuration, the electric motor, the backup hydraulic pump, and the driver are configured integrally so as to allow heat conduction. This results in a state in which an uneven temperature distribution does not easily occur because the equalization of temperature between the electric motor and the backup hydraulic pump is promoted. Accordingly, it is possible to provide even more efficient cooling. Thus, it is possible to further increase the efficiency of the cooling device, thus realizing a further reduction in size and weight of the hydraulic apparatus.

It should be appreciated that the above and other objects, and features and advantages of the present invention will become apparent from the following description taken in conjunction with the accompanying drawings.

DETAILED DESCRIPTION OF THE INVENTION

Hereinafter, embodiments for carrying out the present invention will be described with reference to the accompanying drawings. It should be appreciated that embodiments of the present invention can be widely applied as an aircraft actuator hydraulic apparatus that supplies pressure oil to a hydraulically operated actuator for driving an aircraft control surface.

First Embodiment

Figure 1:
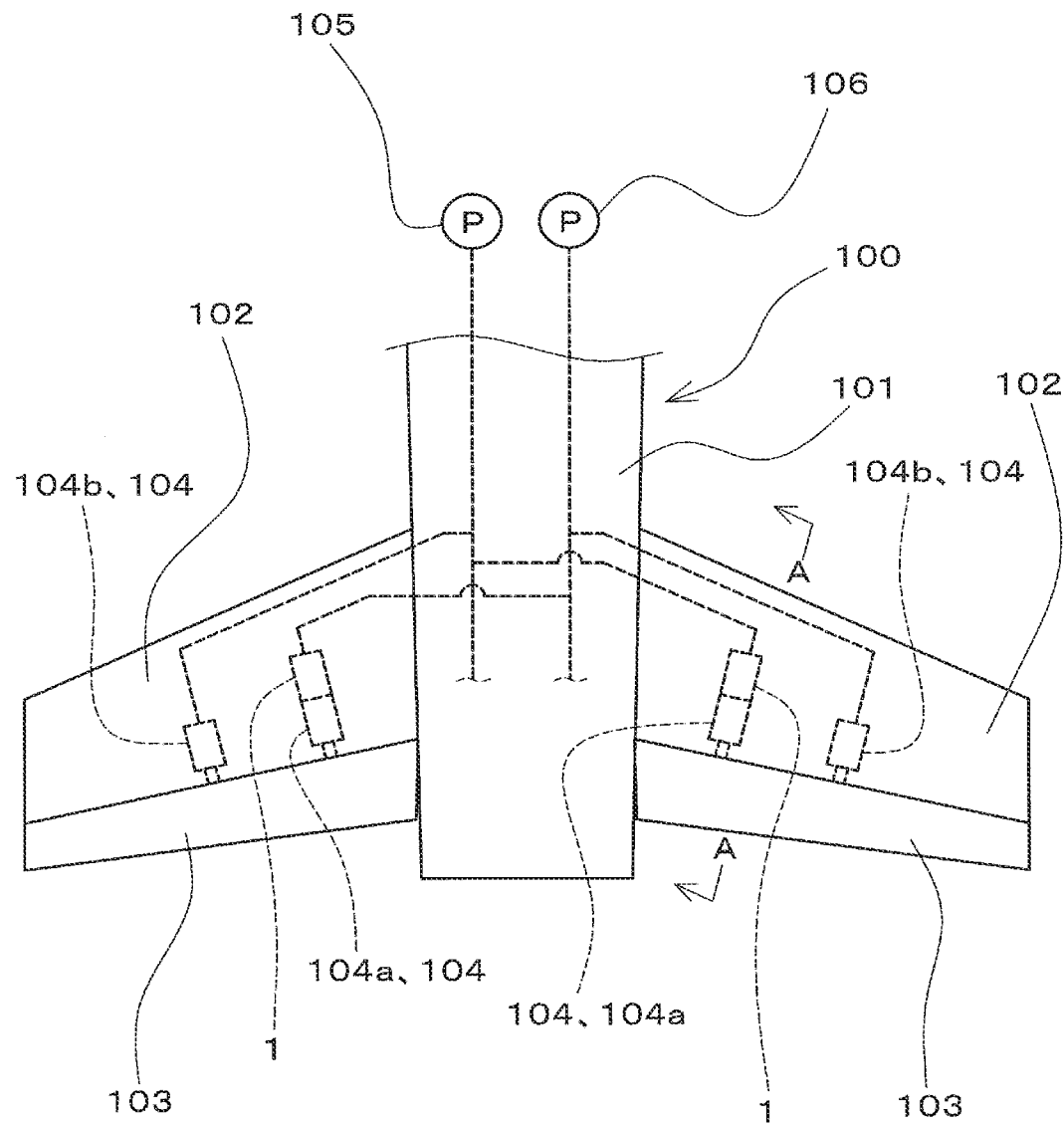
FIG. 1 is a diagram schematically showing part of an aircraft to which an aircraft actuator hydraulic apparatus according to a first embodiment of the present invention is applied.

FIG. 1 is a diagram schematically showing part of an aircraft 100 to which an aircraft actuator hydraulic apparatus 1 (hereinafter, also simply referred to as a "hydraulic apparatus 1") according to a first embodiment of the present invention is applied, showing a rear part of a body 101 of the aircraft 100 and a pair of tailplanes (102, 102). In FIG. 1, illustration of a vertical tail at the rear part of the body 101 is omitted.

Each of the two tailplanes (102, 102) is provided with an elevator 103 as a moving surface (flight control surface) constituting a control surface of the aircraft 100. The elevator 103 of each tailplane 102 is configured to be driven by a plurality of (for example, two) actuators 104 (104a, 104b), as illustrated in FIG. 1. Actuators (104a, 104b) for driving elevators 103 and a hydraulic apparatus 1 configured to supply pressure oil to one of the actuators, namely the actuator 104a, are installed inside each tailplane 102.

Note that the actuators (104a, 104b) and the hydraulic apparatuses 1 that are respectively installed in the pair of tailplanes (102, 102) are configured in the same manner. Therefore, in the following description, the actuators (104a, 104b) and the hydraulic apparatus 1 that are installed in one of the tailplanes 102 will be described. The description of the actuators (104a, 104b) and the hydraulic apparatus 1 installed in the other tailplane is omitted.

Figure 2:
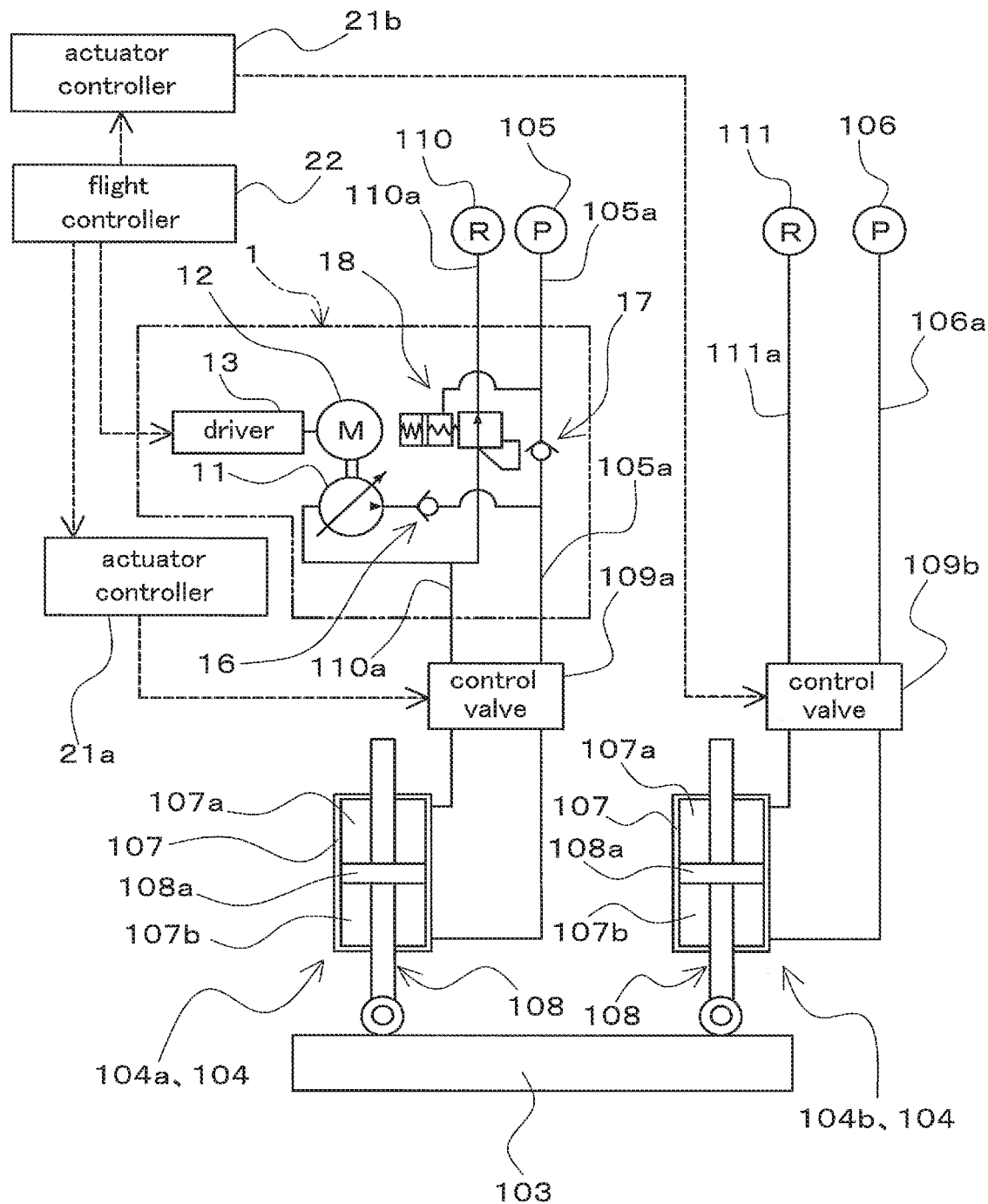
FIG. 2 is a diagram schematically showing a hydraulic circuit including the aircraft actuator hydraulic apparatus shown in FIG. 1 together with a control surface and actuators.

FIG. 2 is a hydraulic circuit diagram schematically showing a hydraulic circuit including the actuators (104a, 104b) for driving an elevator 103 provided in one of the tailplanes 102 and a hydraulic apparatus 1 configured to supply pressure oil to one of the actuators 104a. Each of the actuators (104a, 104b) includes, for example, a cylinder 107 and a rod 108 provided with a piston 108a dividing the interior of the cylinder 107 into two oil chambers (107a, 107b). Also, each of the oil chambers (107a, 107b) in the cylinder 107 of the actuator 104a is configured to be in communication with a first aircraft central hydraulic power source 105 and a reservoir circuit 110 via a control valve 109a. On the other hand, each of the oil chambers (107a, 107b) in the cylinder 107 of the actuator 104b is configured to be in communication with a second aircraft central hydraulic power source 106 and a reservoir circuit 111 via a control valve 109b.

The first aircraft central hydraulic power source 105 and the second aircraft central hydraulic power source 106 each include a hydraulic pump that supplies pressure oil, and are installed on the body 101 side (inside the body 101) as systems that are independent of each other. Also, the first and second aircraft central hydraulic power sources (105, 106) are each provided as an aircraft central hydraulic power source, which is a hydraulic power source that supplies pressure oil to the actuators 104 of the elevator 103 and actuators (not shown) for driving control surfaces other than the elevator 103. Further, the first aircraft central hydraulic power source 105 is connected with the actuators 104 so as to be able to supply pressure oil to the actuator 104a installed in one of the tailplanes 102 and the actuator 104b installed in the other tailplane 102. On the other hand, the second aircraft central hydraulic power source 106 is connected so as to be able to supply pressure oil to the actuator 104b installed in one of the tailplanes 102 and the actuator 104a installed in the other tailplane 102.

The reservoir circuit 110 includes a tank (not shown) into which oil (hydraulic fluid) that is supplied as pressure oil and is thereafter discharged from the actuators 104 flows back, and the reservoir circuit 110 is configured to be in communication with the first aircraft central hydraulic power source 105. The reservoir circuit 111 that is configured as a system independent of the reservoir circuit 110 includes a tank (not shown) into which oil (hydraulic fluid) that is supplied as pressure oil and is thereafter discharged from the actuators 104 flows back, and the reservoir circuit 111 is configured to be in communication with the second aircraft central hydraulic power source 106 that is configured as a system independent of the first aircraft central hydraulic power source 105. Note that the reservoir circuit 110 is connected with the actuator 104a installed in one of the tailplanes 102 and the actuator 104b installed in the other tailplane 102, and is also connected with the first aircraft central hydraulic power source 105. Consequently, the pressure of the oil that has returned to the reservoir circuit 110 is raised by the first aircraft central hydraulic power source 105, and the oil is supplied to predetermined actuators 104. On the other hand, the reservoir circuit 111 is connected with the actuator 104b installed in one of the tailplanes 102 and the actuator 104a installed in the other tailplane 102, and is also connected with the second aircraft central hydraulic power source 106. Consequently, the pressure of the oil that has returned to the reservoir circuit 111 is raised by the second aircraft central hydraulic power source 106, and the oil is supplied to predetermined actuators 104.

The control valve 109a is provided as a valve mechanism that switches the state of connection of the oil chambers (107a, 107b) with a supply passage 105a that is in communication with the first aircraft central hydraulic power source 105 and an exhaust passage 110a that is in communication with the reservoir circuit 110. The control valve 109b is provided as a valve mechanism that switches the state of connection of the oil chambers (107a, 107b) with a supply passage 106a that is in communication with the second aircraft central hydraulic power source 106 and an exhaust passage 111a that is in communication with the reservoir circuit 111. The control valve 109a may be configured, for example, as an electromagnetic switching valve, and may be driven in accordance with a command signal from an actuator controller 21a that controls operation of the actuator 104a. The control valve 109b may be configured, for example, as an electromagnetic switching valve, and may be driven in accordance with a command signal from an actuator controller 21b that controls operation of the actuator 104b.

Note that actuator controller 21a controls the actuator 104a in accordance with a command signal from a flight controller 22 serving as a superordinate computer that commands operation of the elevator 103. The actuator controller 21b controls the actuator 104b in accordance with a command signal from the flight controller 22.

The actuator controller 21a and the actuator controller 21b may be installed, for example, as controllers of a centralized control system, or controllers of a distributed processing system. In the case of a centralized control system, the actuator controller 21a and the actuator controller 21b are installed in a single casing (not shown) installed on the body 101 side, and the system is configured such that the actuator controller 21a controls the actuator 104a and the actuator controller 21b controls the actuator 104b. In the case of a distributed processing system, the actuator controller 21a is installed in a casing (not shown) mounted to the actuator 104a and the actuator controller 21b is installed in a casing (not shown) mounted to the actuator 104b, and the system is configured such that the actuator controller 21a controls the actuator 104a and the actuator controller 21b controls the actuator 104b. Although this embodiment has been described taking, as an example, a configuration in which command signals from a single flight controller 22 are input into a plurality of different actuator controllers (21a, 21b), this need not be the case. For example, it is possible to adopt a configuration in which command signals from different flight controllers are respectively input into a plurality of different actuator controllers (21a, 21b).

Further, the above-described control valve 109a is switched in accordance with a command from the actuator controller 21a, and thereby pressure oil is supplied from the supply passage 105a to one of the oil chambers (107a, 107b) and the oil is discharged from the other of the oil chambers (107a, 107b) to the exhaust passage 110a. Consequently, the rod 108 is displaced relative to the cylinder 107, thus driving the elevator 103. Although not shown, a mode switching valve that switches the state (mode) of communication between the oil chambers (107a, 107b) is provided between the control valve 109a and the actuator 104a. Note that the control valve 109b is configured in the same manner as the control valve 109a described above, and therefore the description thereof is omitted.

Next, the hydraulic apparatus 1 according to this embodiment will be described in detail. The hydraulic apparatus 1 shown in FIGS. 1 and 2 is configured to supply pressure oil to the hydraulically operated actuator 104a for driving the elevator 103. Although this embodiment has been described, taking, as an example, a configuration in which the hydraulic apparatus 1 supplies pressure oil to the actuator 104a for driving a control surface configured as the elevator 103, this need not be the case. That is, the hydraulic apparatus 1 may be used as a hydraulic apparatus that supplies pressure oil to an actuator for driving a control surface other than an elevator, such as an aileron.

Figure 3:
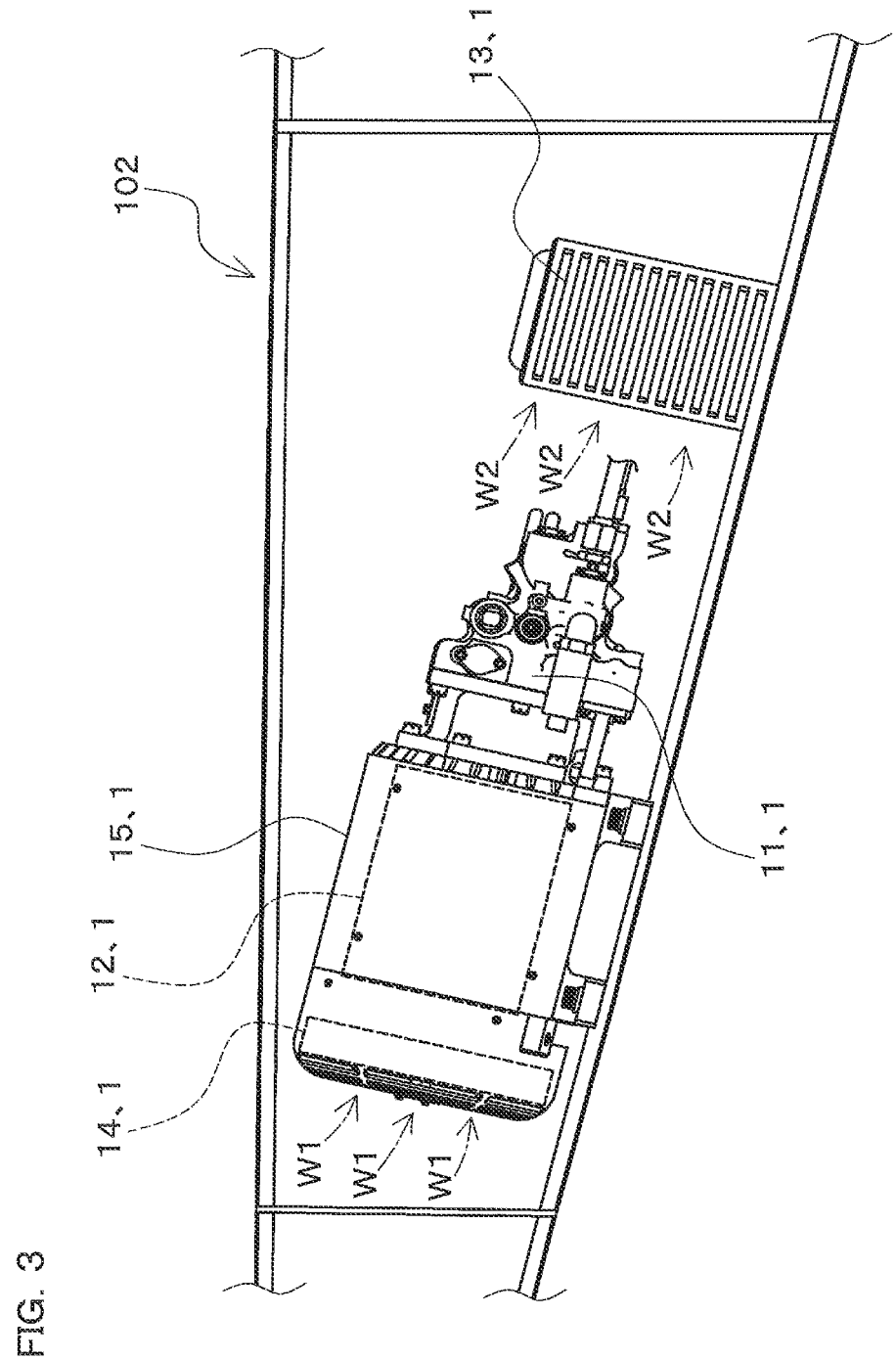
FIG. 3 is a diagram showing the aircraft actuator hydraulic apparatus shown in FIG. 1 together with part of a wing, as viewed from the position of the arrows A-A.

FIG. 3 is a diagram showing the hydraulic apparatus 1 together with part of the tailplane 102, as viewed from the position of the arrows A-A in FIG. 1. The hydraulic apparatus 1 shown in FIGS. 1 to 3 includes a backup hydraulic pump 11, an electric motor 12, a driver 13, a fan 14, a housing 15, and so forth. Note that in FIG. 3, part of the tailplane 102 is shown in perspective as a diagram including a cross section as viewed from the side of the housing 15 and so forth. In addition, illustration of the elements other than the tailplane 102 and the hydraulic apparatus 1 are omitted in FIG. 3.

As shown in FIG. 3, the backup hydraulic pump 11, the electric motor 12, the driver 13, the fan 14, and the housing 15 are installed inside the tailplane 102, at which the elevator 103 of the aircraft 100 is provided. Also, the housing 15 is configured as a unitary casing (for example, a metal, ceramic, or an SiC casing), and the electric motor 12, the backup hydraulic pump 11, and the fan 14 are installed in the housing 15. Note that the electric motor 12 and the fan 14, which are indicated by the dashed lines in FIG. 3, are housed inside the housing 15, and the backup hydraulic pump 11 is fixed to the housing 15 in a state in which it projects from the housing 15. Also, the housing 15 and the driver 13 are fixed to a component on the undersurface side of the structure constituting the tailplanes 102.

The backup hydraulic pump 11 may be configured, for example, as a variable capacity-type hydraulic pump. The suction side of the backup hydraulic pump 11 is connected in communication with the exhaust passage 110a, and its discharge side is connected in communication with the supply passage 105a via a check valve 16 so as to be able to supply pressure oil to the supply passage 105a. Further, the backup hydraulic pump 11 is provided as a hydraulic pump that can supply pressure oil to the actuator 104a at the occurrence of a loss or degradation of the function (pressure oil supply function) of the first aircraft central hydraulic power source 105 due to a failure of the hydraulic pump, an oil leakage, or the like in the first aircraft central hydraulic power source 105.

A check valve 17 that permits flow of pressure oil into the actuator 104a and prevents flow of the oil in the opposite direction is provided upstream (on the first aircraft central hydraulic power source 105 side) of a location of the supply passage 105a where the discharge side of the backup hydraulic pump 11 is connected. Further, a relief valve 18 that discharges pressure oil into the reservoir circuit 110 when the pressure of the oil discharged from the actuator 104a rises is provided downstream (on the reservoir circuit 110 side) of a location of the exhaust passage 110a where the suction side of the backup hydraulic pump 11 is connected. Also, the relief valve 18 is provided with a pilot pressure chamber that is in communication with the supply passage 105a and in which a spring is disposed. When the pressure of the pressure oil supplied from the supply passage 105a decreases below a predetermined pressure value, the pressure of the pressure oil that is supplied as a pilot pressure oil to the pilot pressure chamber (pilot pressure) from the supply passage 105a also decreases below a predetermined pressure value, as a result of which the exhaust passage 110a is blocked by the relief valve 20. In the case of a loss or degradation of the function of the first aircraft central hydraulic power source 105, the provision of the above-described check valves (16, 17) and the relief valve 18 allows the pressure of the oil discharged from the actuator 104a to be raised by the backup hydraulic pump 11 without returning the oil to the reservoir circuit 110, and the pressure oil is supplied to the actuator 104a with an increased pressure.

The electric motor 12 is coupled to the backup hydraulic pump 11 via a coupling (not shown) or directly without any coupling, and is configured to drive the backup hydraulic pump 11. Note that the operational status of the electric motor 12 is controlled via the driver 13 in accordance with a command signal from the flight controller 22 serving as a superordinate computer that commands operation of the elevator 103. Also, the driver 13 includes a circuit board or the like that drives the electric motor 12 by controlling the electric power supplied to the electric motor 12 and the running speed (rotation speed) of the electric motor 12 in accordance with a command signal from the flight controller 22.

The flight controller 22 is connected to a pressure sensor (not shown) that detects the discharge pressure of the first aircraft central hydraulic power source 105 or the pressure of pressure oil passing through the supply passage 105a such that a pressure detection signal detected by the pressure sensor is input into the flight controller 22. Also, the flight controller 22 is configured to detect a loss or degradation of the function of the first aircraft central hydraulic power source 105 in accordance with the above-described pressure detecting signal.

For example, the flight controller 22 may be configured to detect a degradation of the function of the first aircraft central hydraulic power source 105 according to the timing at which the pressure value of the pressure detection signal becomes equal to or less than a first predetermined pressure value, and detect a loss of the function of the first aircraft central hydraulic power source 105 according to the timing at which the pressure value of the pressure detection signal becomes equal to or less than a predetermined second pressure value that is smaller than the first pressure value. When a loss or degradation of the function of the first aircraft central hydraulic power source 105 is detected by the flight controller 22, operation of the electric motor 12 is started in accordance with a command signal from the flight controller 22, as a result of which pressure oil is supplied to the actuator 104a as described above.

The fan 14 is provided as a cooling fan that rotates together with the rotating shaft of the electric motor 12, and constitutes a cooling device of this embodiment that simultaneously cools the backup hydraulic pump 11, the electric motor 12, and the driver 13. Also, the fan 14 is provided, for example, as an axial fan, a sirocco fan, or the like.

Further, the fan 14 is installed so as to be coupled to the rotating shaft of the electric motor 12 on the side opposite to the backup hydraulic pump 11 side, and is configured to be rotationally driven by the rotational driving force of the electric motor 12, as described above. Also, many slit-like openings for taking in air are formed in an end of the housing 15 in a portion that the cooling fan 14 faces. As indicated by the arrows W1 shown as arrows of alternate long and short dash lines in FIG. 3, the fan 14 is configured to take in air from openings at an end of the housing 15 and to generate cooling air flows flowing through the interior of the housing 15 toward the backup hydraulic pump 11.

The electric motor 12, the backup hydraulic pump 11, and the driver 13 are installed on the downstream side of the cooling air generated by the fan 14, and the driver 13 is installed further downstream with respect to the electric motor 12 and the backup hydraulic pump 11. Consequently, the electric motor 12, the backup hydraulic pump 11, and the driver 13 are cooled by the cooling air generated by the fan 14. In FIG. 3, a cooling air flow that flows toward the driver 13 after cooling the electric motor 12 and the backup hydraulic pump 11 is indicated by the arrows W2 of long dashed short dashed lines.

Next, the operation of the hydraulic apparatus 1 will be described. Note that the operation of the hydraulic apparatus 1 will be described only for the hydraulic apparatus 1 connected with the first aircraft central hydraulic power source 105 and the operation of the hydraulic apparatus 1 connected with the second aircraft central hydraulic power source 106 is the same as this and thus is omitted, as with the description of the above configuration of the hydraulic apparatus 1.

In a state where no loss or degradation of the function of the first aircraft central hydraulic power source 105 has occurred, the backup hydraulic pump 11 is not operated. In this state, the pressure oil from the first aircraft central hydraulic power source 105 is supplied to one of the oil chambers (107a, 107b) of the actuator 104a via the control valve 109a. The oil is discharged from the other of the oil chambers (107a, 107b) and is returned to the reservoir circuit 110 via the control valve 109a. Further, switching between the oil chambers (107a, 107b) to which the pressure oil is supplied and from which the pressure oil is discharged is performed by switching the state of connection of the control valve 109a in accordance with a command signal from the actuator controller 21a, as a result of which the actuator 104a is operated to drive the elevator 103.

On the other hand, when a loss or degradation of the function of the first aircraft central hydraulic power source 105 occurs, electric power is supplied to the electric motor 12 via the driver 13 in accordance with a command signal from the flight controller 22, thus starting operation of the electric motor 12 to start operation of the backup hydraulic pump 11. Then, the pressure oil from the backup hydraulic pump 11 is supplied to one of the oil chambers (107a, 107b) of the actuator 104a via the control valve 109a. The pressure oil is discharged from the other of the oil chambers (107a, 107b) and is then sucked in by the backup hydraulic pump 11 via the control valve 109a, and thereby the pressure of the oil is raised. Further, switching between the oil chambers (107a, 107b) to which the pressure oil is supplied and from which the pressure oil is discharged is performed by switching the state of connection of the control valve 109a in accordance with a command signal from the actuator controller 21a, as a result of which the actuator 104a is operated to drive the elevator 103.

When the hydraulic apparatus 1 is operated as described above, the backup hydraulic pump 11, the electric motor 14, and the driver 13 generate heat. If sufficient cooling is not provided, then the temperatures of these components will increase excessively. However, in the hydraulic apparatus 1, the increase in temperature of these components is suppressed because the cooling device is provided that is configured as the fan 14 and that simultaneously cools the backup hydraulic pump 11, the electric motor 12, and the driver 13. That is, the flow of cooling air generated by the fan 14 passes through the inside of the housing 15 and removes the heat generated in the electric motor 12, thus cooling the electric motor 12. Then, this cooling air flows further downstream and thereby removes the heat generated in the backup hydraulic pump 11 and the driver 13, making it possible to cool the backup hydraulic pump 11 and the driver 13 as well.

As described thus far, with the hydraulic apparatus 1, even if a loss or degradation of the function of the aircraft central hydraulic power sources (105, 106) occurs, the actuator 104a can be driven by the pressure oil supplied from the backup hydraulic pump 11 installed inside the tailplane 102. Also, the backup hydraulic pump 11, the electric motor 12, and the driver 13 are installed inside the tailplane 102 at which the elevator 103 is installed, and are thus installed in a region closer to the actuator 104a. Accordingly, there is no need for a long, large piping system or the like that is required when they are installed on the body side of the aircraft. This makes it possible to realize a reduction in size and weight of the hydraulic apparatus 1.

Further, in the hydraulic apparatus 1, the fan 14 serving as a cooling device for suppressing an increase in temperature of the apparatus is configured to simultaneously cool the backup hydraulic pump 11, the electric motor 12, and the driver 13. Accordingly, the backup hydraulic pump 11, the electric motor 12, and the driver 13 can be efficiently cooled by the same cooling device (fan 14). This makes it possible to suppress an increase in temperature of the apparatus, while realizing a reduction in size and weight of the apparatus by efficiently sharing the cooling device (fan 14). Accordingly, it is possible to realize a reduction in size and weight of the hydraulic apparatus 1 also including the cooling device (fan 14). Since the cooling device (fan 14) is installed in the tailplane 102 of the aircraft 100, it is also possible to prevent a decrease in efficiency of the body of the aircraft.

Therefore, according to this embodiment, it is possible to provide an aircraft actuator hydraulic apparatus 1 that can drive the actuator 104a even in the case of a loss or degradation of the function of the aircraft central hydraulic power sources (105, 106), that can prevent a decrease in efficiency of the body of the aircraft, that can suppress an increase in temperature of the apparatus, and that can realize a reduction in size and weight of the configuration of the apparatus.

Furthermore, with the hydraulic apparatus 1, the cooling fan 14 that is installed in the electric motor 12 and rotates together with the rotating shaft can be utilized efficiently to cool the backup hydraulic pump 11 and the driver 13 as well. Accordingly, it is possible to further increase the efficiency of the cooling device, thus realizing a further reduction in size and weight of the hydraulic apparatus 1.

With the hydraulic apparatus 1, the electric motor 12, the backup hydraulic pump 11, and the driver 13 are installed in this order on the downstream side of the cooling air generated by the fan 14 that rotates together with the rotating motor shaft for cooling the electric motor 12. Accordingly, the cooling air generated by the fan 14 for cooling the electric motor 12 can be efficiently flown to the driver 13, in addition to the backup hydraulic pump 11 coupled to the electric motor 12, thus realizing further efficient cooling. This makes it possible to improve the efficiency of the cooling device even further, thus achieving a further reduction in size and weight of the hydraulic apparatus 1.

With the hydraulic apparatus 1, the electric motor 12, the backup hydraulic pump 11, and the fan 14 are installed in the unitary housing 15. This results in a state in which an uneven temperature distribution does not easily occur because the equalization of temperature is promoted by the heat conduction between the electric motor 12 and the backup hydraulic pump 11. Accordingly, it is possible to provide even more efficient cooling by the fan 14. Thus, it is possible to further increase the efficiency of the cooling device, thus realizing a further reduction in size and weight of the hydraulic apparatus 1.

Although this embodiment has been described taking, as an example, a configuration in which the fan 14 serving as the cooling device is housed in the housing 15 together with the electric motor 12, this need not be the case. The fan 14 may be installed separate from the housing 15. In this case, it is sufficient that the fan 14 is installed at a position where it can cool the electric motor 12, the backup hydraulic pump 11, and the driver 13 simultaneously. Although this embodiment has been described taking the fan 14 as an example of the cooling device, this need not be the case; it is possible to implement a hydraulic apparatus including a cooling device having a configuration other than a fan. For example, it is also possible to implement a hydraulic apparatus including a cooling device configured as an air-conditioning device capable of cooling the electric motor 12, the backup hydraulic pump 11, and the driver 13 by cooling the air inside the tailplane 102.

Figure 4:
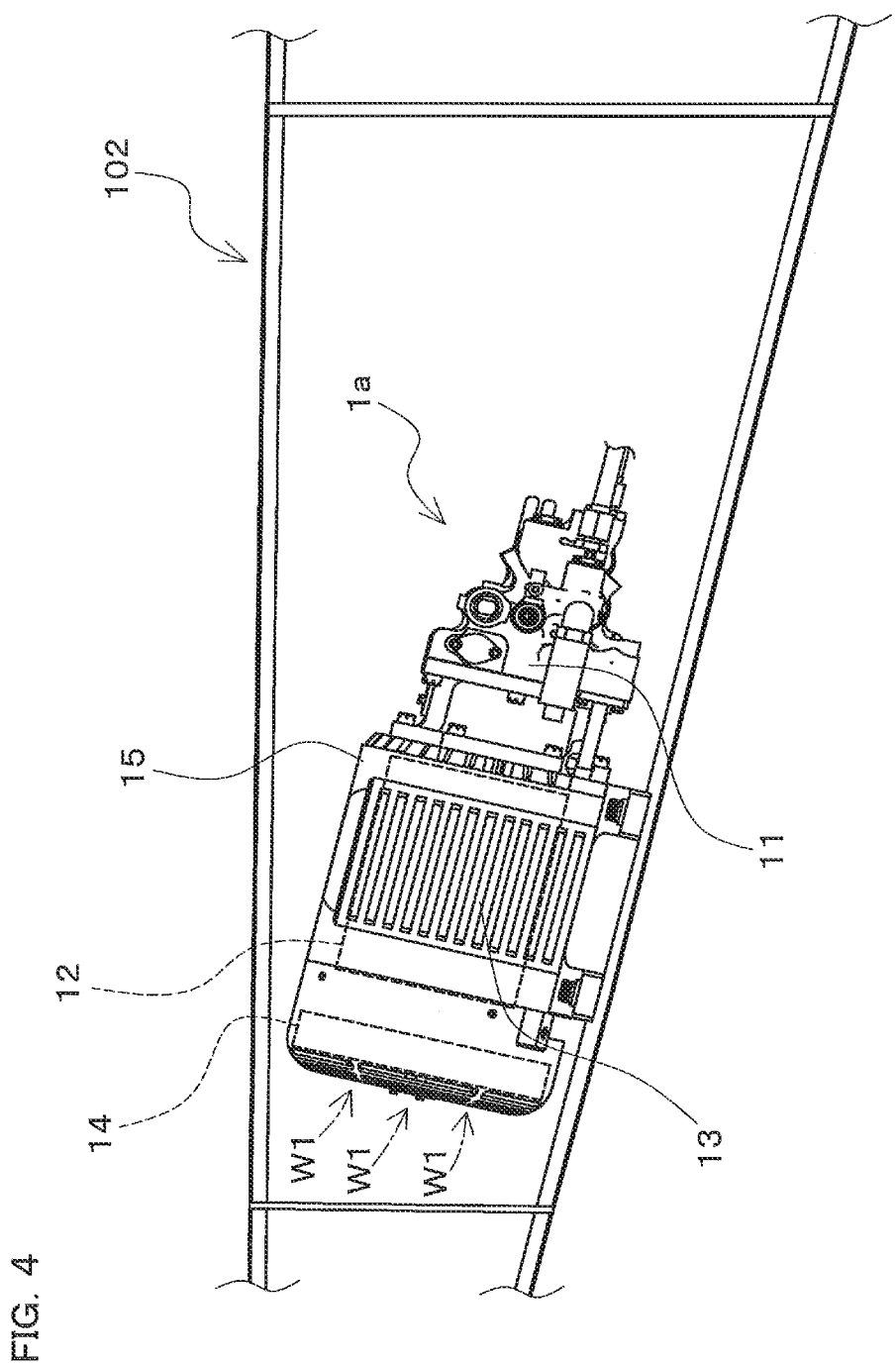
FIG. 4 is a diagram showing an aircraft actuator hydraulic apparatus according to a modification, together with part of a wing.

FIG. 4 is a diagram showing an aircraft actuator hydraulic apparatus 1a (hereinafter, simply referred to as a "hydraulic apparatus 1a") according to a modification of the first embodiment. FIG. 4 shows the hydraulic apparatus 1a together with part of a tailplane 102, in a state corresponding to FIG. 3. As with the hydraulic apparatus 1, the hydraulic apparatus 1a includes a backup hydraulic pump 11, an electric motor 12, a driver 13, a fan 14, and a housing 15. However, the hydraulic apparatus 1a is different from the hydraulic apparatus 1 with respect to the configuration in which the driver 13 is installed. In the description of the hydraulic apparatus 1a shown in FIG. 4, the differences from the hydraulic apparatus 1 will be described. The description of those elements configured in the same manner as in the hydraulic apparatus 1 and the cooling air flows that are drawn in by the fan 14 (the cooling air flows in the direction of the arrows W1) is omitted by using the same reference numerals in the drawing.

As shown in FIG. 4, the driver 13 of the hydraulic apparatus 1a is installed in the housing 15. Thereby, in the hydraulic apparatus 1a, the electric motor 12, the backup hydraulic pump 11, and the driver 13 are provided integrally so as allow heat conduction among each other. That is, the electric motor 12, the backup hydraulic pump 11, and the driver 13 are integrated so as to allow heat conduction among them via the housing 15. Note that in the hydraulic apparatus 1a, the heat generated in the electric motor 12 and the backup hydraulic pump 11 is removed by the cooling air generated by the fan 14, and thereby the electric motor 12 and the backup hydraulic pump 11 are cooled. Then, the heat that is generated in the driver 13 and then conducted to the housing 15 can also be removed by the cooling air generated by the fan 14, and thereby the driver 15 is also cooled.

With the hydraulic apparatus 1a described above, the electric motor 12, the backup hydraulic pump 11, and the driver 13 are configured integrally so as to allow heat conduction. This results in a state in which an uneven temperature distribution does not easily occur because the equalization of temperature between the electric motor 12 and the backup hydraulic pump 11 is promoted. Accordingly, it is possible to provide even more efficient cooling. Thus, it is possible to further increase the efficiency of the cooling device, thus realizing a further reduction in size and weight of the hydraulic apparatus 1a. As a further modification of the hydraulic apparatus 1a, it is possible to implement a hydraulic apparatus in which the fan 14 or a cooling device having a configuration other than a fan is separate from the housing 15, and is installed separate from the electric motor 12, the backup hydraulic pump 11, and the driver 13, which are installed so as to allow heat conduction among each other.

Second Embodiment

Next, an aircraft actuator hydraulic apparatus 2 (hereinafter, also simply referred to as a "hydraulic apparatus 2") according to a second embodiment of the present invention will be described. As with the hydraulic apparatus 1 of the first embodiment, the hydraulic apparatus 2 is configured to supply pressure oil to a hydraulically operated actuator 104a for driving an elevator 103 that is provided at a tailplane 102 of an aircraft 100. Also, the hydraulic apparatus 2 is connected with a first aircraft central hydraulic power source 105, a reservoir circuit 110, and a control valve 109a as with the hydraulic apparatus 1 of the first embodiment. Further, the hydraulic apparatus 2 is configured to operate in accordance with a command signal from a flight controller 22 as with the hydraulic apparatus 1.

Figure 5:
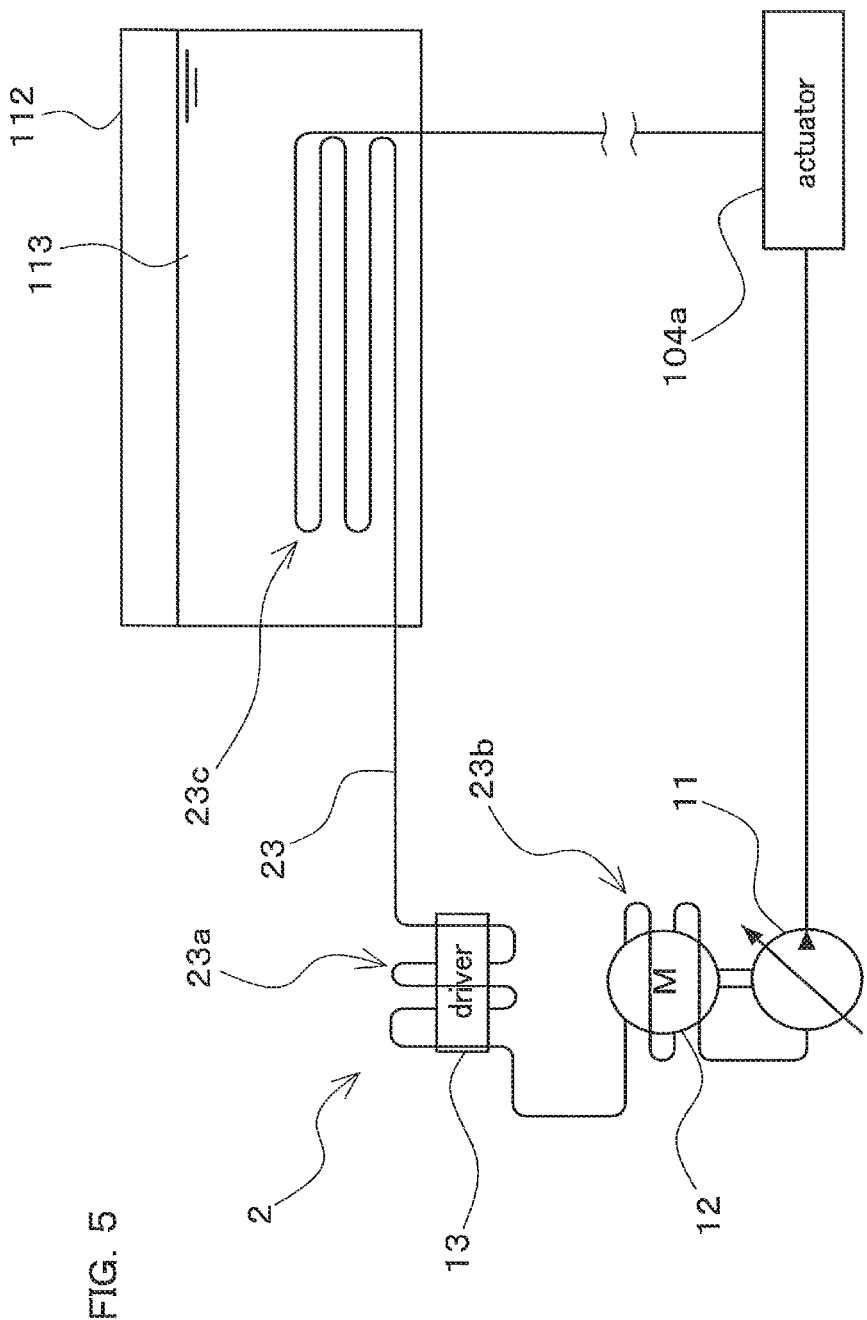
FIG. 5 is a diagram schematically showing a hydraulic circuit including an aircraft actuator hydraulic apparatus according to a second embodiment of the present invention together with an actuator and a fuel tank of an aircraft.

FIG. 5 is a diagram schematically showing, in a simplified manner, a hydraulic circuit including the hydraulic apparatus 2 together with the actuator 104a and a fuel tank 112 of the aircraft 100. The hydraulic apparatus 2 includes a backup hydraulic pump 11, an electric motor 12, a driver 13, and a cooling device 23 as with the hydraulic apparatus 1 of the first embodiment. However, the configuration of the cooling device 23 of the hydraulic apparatus 2 is different from that of the cooling device (fan 14) of the hydraulic apparatus 1 of the first embodiment. In the following description of the hydraulic apparatus 2, the differences in configuration from the first embodiment will be described. The description of those elements configured in the same manner as in the first embodiment is omitted by using the same reference numerals in the drawings, or by referring to the same reference numerals.

The cooling device 23 is configured as an oil pipe (hereinafter, also referred to as an "oil pipe 23") through which flows pressure oil that is supplied from the backup hydraulic pump 11 and is circulated between the backup hydraulic pump 11 and the actuator 104a. Also, the cooling device 23 is installed extending from the inside of the tailplane 102 to the inside of the body 101, and is installed so as to pass through the inside of the fuel tank 112 in which a fuel 113 used for the engine of the aircraft 100 is stored.

The oil pipe 23 serving as a cooling device is provided with a first coil portion 23a, a second coil portion 23b, and a third coil portion 23c that are bent in a coiled form. The first coil portion 23a is provided in a portion of the oil pipe 23 that is in contact with the surface of the driver 13, and is formed as a portion for securing a large surface area that is in contact with the driver 13 so as to allow efficient heat exchange with the driver 13. Thereby, the first coil portion 23a is configured to be able to efficiently remove the heat generated in the driver 13, thus cooling the driver 13.

The second coil portion 23b is provided in a portion of the oil pipe 23 that is in contact with the surface of the electric motor 12, and is formed as a portion for securing a large surface area that is in contact with the electric motor 12 so as to allow efficient heat exchange with the electric motor 12. Thereby, the second coil portion 23b is configured to be able to efficiently remove the heat generated in the electric motor 12, thus cooling the electric motor 12. Note that the oil pipe 23 is connected with the suction side and the discharge side of the backup hydraulic pump 11, and is provided as a pipe path through which the oil (hydraulic fluid) whose pressure is increased by the backup hydraulic pump 11 is circulated between the backup hydraulic pump 11 and the actuator 104a. Accordingly, the oil flowing through the oil pipe 23 passes through the backup hydraulic pump 11 and thereby removes the heat generated in the backup hydraulic pump 11, thus cooling the backup hydraulic pump 11.

The third coil portion 23c is provided in a portion of the oil pipe 23 that is installed in the fuel tank 112, and is formed as a portion for securing a large surface area so as to allow efficient heat exchange with the fuel 113 stored in the fuel tank 112. Thereby, the third coil portion 23c is configured to release, into the fuel 113 inside the fuel tank 112, the heat removed from the driver 13, the electric motor 12, and the backup hydraulic pump 11.

As described above, the oil pipe 23 includes the first coil portion 23a, the second coil portion 23b, and the third coil portion 23c, and is configured to pass through the backup hydraulic pump 11. Thereby, the oil pipe 23 is installed so as to allow heat exchange with the backup hydraulic pump 11 and the electric motor 12, and is installed so as to allow heat exchange also with the driver 13.

With the hydraulic apparatus 2 described thus far, even if a loss or degradation of the function of the aircraft central hydraulic power sources (105, 106) occurs, the actuator 104a can be driven by the pressure oil supplied from the backup hydraulic pump 11 installed inside the tailplane 102, as with the hydraulic apparatus 1 of the first embodiment. Also, the backup hydraulic pump 11, the electric motor 12, and the driver 13 are installed inside the tailplane 102 at which the elevator 103 is installed, and are thus installed in a region closer to the actuator 104a. Accordingly, there is no need for a long, large piping system or the like that is required when they are installed on the body side of the aircraft. This makes it possible to realize a reduction in size and weight of the hydraulic apparatus 2.

Further, in the hydraulic apparatus 2, the oil pipe 23 serving as a cooling device for suppressing an increase in temperature of the apparatus is configured to simultaneously cool the backup hydraulic pump 11, the electric motor 12, and the driver 13. Accordingly, the backup hydraulic pump 11, the electric motor 12, and the driver 13 can be efficiently cooled by the same cooling device 23. This makes it possible to suppress an increase in temperature of the apparatus, while realizing a reduction in size and weight of the apparatus by efficiently sharing the cooling device 23. Accordingly, it is possible to realize a reduction in size and weight of the hydraulic apparatus 2 also including the cooling device 23. Further, the cooling device 23 is installed inside the body 101 of the aircraft 100 or inside the tailplane 102, and it is therefore possible to prevent a reduction in the efficiency of the aircraft body.

Accordingly, it is possible, with this embodiment, to provide an aircraft actuator hydraulic apparatus 2 that can drive an actuator 104a even in the case of a loss or degradation of the function of the aircraft central hydraulic power source (105, 106), that can prevent a decrease in the efficiency of the body of the aircraft, that can suppress an increase in temperature of the apparatus, and that can realize a reduction in size and weight of the configuration of the apparatus.

Further, with the hydraulic apparatus 2, the cooling device 23 configured as the oil pipe 23 is installed so as to allow heat exchange with all of the backup hydraulic pump 11, the electric motor 12, and the driver 13. Accordingly, the heat generated in the electric motor 12, the backup hydraulic pump 11, and the driver 13 can be removed via the oil pipe 23, thus efficiently cooling the electric motor 12, the backup hydraulic pump 11, and the driver 13. Furthermore, the cooling device 23 can be configured using the oil pipe 23, and it is therefore possible to further increase the efficiency of the equipment. Accordingly, it is possible to realize a further reduction in size and weight of the hydraulic apparatus 2.

With the hydraulic apparatus 2, the pipe for the pressure oil that is supplied from the backup hydraulic pump 11 and is circulated can also be used as the cooling device 23. Accordingly, it is possible to further increase the efficiency of the equipment, thus achieving a further reduction in size and weight of the hydraulic apparatus 2.

Further, with the hydraulic apparatus 2, the pressure oil pipe also used as the cooling device 23 passes through the inside of the fuel tank 112 of the aircraft 100. Accordingly, heat is exchanged between the pressure oil and the fuel 113 in the fuel tank 112, and the heat generated in the backup hydraulic pump 11 and the like is removed, thus releasing heat from the pressure flowing through the pipe (oil pipe 23) to the fuel 113 in the fuel tank 112. This makes it possible to cool the fuel 113 in the fuel tank 112 by efficiently using the pressure oil flowing through the pressure oil pipe serving as the cooling device 23.

Although this embodiment has been described taking, as an example, a configuration in which the oil pipe serving as the cooling device 23 is a pipe for the pressure oil that is supplied from the backup hydraulic pump 11 and is circulated, this need not be the case. The pipe serving as the cooling device may be configured as an oil pipe that is independent of the above-described pipe for pressure oil. Further, in this case, the oil pipe that is provided as the cooling device and is separate from the pressure oil pipe may be provided so as to pass though the inside of the fuel tank.

Further, although this embodiment has been described taking, as an example, a configuration in which the oil pipe 23 is provided with a single third coil portion 23 installed inside the fuel tank 112, this need not be the case; it is possible to implement a configuration in which third coil portions 23 are provided in a plurality of locations in separate positions in the oil pipe 23. In this case, the third coil portions 23c installed inside the fuel tank 112 in the oil pipe 23 may be provided, for example, in a plurality of locations, including a location between a portion connected with the actuator 104a and a portion in contact with the driver 13, and a location between a portion connected with the backup hydraulic pump 11 and a portion connected with the actuator 104a.

Although embodiments of the present invention have been described, the present invention is not limited to the above-described embodiments, and various modifications may be made within the scope recited in the claims. That is, it is possible to implement an aircraft actuator hydraulic apparatus that supplies pressure oil to an actuator for driving a control surface other than an elevator, such as an aileron. Further, various modifications can be made to the configuration of the hydraulic circuit that connects the aircraft actuator hydraulic apparatus with the aircraft central hydraulic power sources.

The present invention can be widely used as an aircraft actuator hydraulic apparatus that supplies pressure oil to a hydraulically operated actuator for driving a control surface of an aircraft. The present invention is not limited to the above-described embodiments, and all modifications, applications and equivalents thereof that fall within the claims, for which modifications and applications would become apparent by reading and understanding the present specification, are intended to be embraced therein.

What is claimed is:

1. An aircraft actuator hydraulic apparatus for supplying pressure oil to a hydraulically operated actuator for driving a control surface of an aircraft, the aircraft includes a body and at least a wing, the apparatus comprising:
   at least one aircraft central hydraulic power source;
   a backup hydraulic pump installed inside a wing at which the control surface of the aircraft is provided and to provide supply pressure oil to the actuator when a loss or degradation occurs in a function of the at least one aircraft central hydraulic power source that supplies pressure oil to the actuator;
   an electric motor installed inside the wing and configured to drive the backup hydraulic pump;
   a driver installed inside the wing and configured to drive the electric motor; and
   a cooling device installed inside at least one of the wing and the body of the aircraft and to simultaneously cool the backup hydraulic pump, the electric motor, and the driver,
   wherein the cooling device is a fan configured to rotate together with a rotating shaft of the electric motor, and
   wherein the electric motor, the backup hydraulic pump, and the driver are installed on a downstream side of cooling air generated by the fan, and the driver is installed further downstream with respect to the electric motor and the backup hydraulic pump.

2. The aircraft actuator hydraulic apparatus according to claim 1,
   wherein the electric motor, the backup hydraulic pump, and the fan are installed in a unitary casing.

3. The aircraft actuator hydraulic apparatus according to claim 1,
   wherein the electric motor, the backup hydraulic pump, and the driver are provided integrally so as to allow heat conduction among each other.

4. An aircraft actuator hydraulic apparatus for supplying pressure oil to a hydraulically operated actuator for driving a control surface of an aircraft, the aircraft includes a body and at least a wing, the apparatus comprising:
   at least one aircraft central hydraulic power source;
   a backup hydraulic pump installed inside a wing at which the control surface of the aircraft is provided and to provide supply pressure oil to the actuator when a loss or degradation occurs in a function of the at least one aircraft central hydraulic power source that supplies pressure oil to the actuator;
   an electric motor installed inside the wing and configured to drive the backup hydraulic pump;
   a driver installed inside the wing and configured to drive the electric motor; and
   a cooling device installed inside at least one of the wing and the body of the aircraft and to simultaneously cool the backup hydraulic pump, the electric motor, and the driver,
   wherein the cooling device is an oil pipe installed so as to allow heat exchange with the backup hydraulic pump and the electric motor and to allow heat exchange also with the driver.

5. The aircraft actuator hydraulic apparatus according to claim 4,
   wherein the oil pipe is a pipe through which flows pressure oil that is supplied from the backup hydraulic pump and is circulated between the backup hydraulic pump and the actuator.

6. The aircraft actuator hydraulic apparatus according to claim 5,
   wherein the oil pipe is installed so as to pass through the inside of a fuel tank in which fuel for the aircraft can be stored.

7. The aircraft actuator hydraulic apparatus according to claim 4,
   wherein the electric motor, the backup hydraulic pump, and the driver are provided integrally so as to allow heat conduction among each other.

* * * * *